Patented July 5, 1949

2,475,136

UNITED STATES PATENT OFFICE 2,475,136

STABILIZERS FOR PHOTOGRAPHIC
SILVER-HALIDE EMULSIONS

Newton Heimbach and Walter Kelly, Jr., Binghamton, N. Y., assignors to General Aniline & Film Corporation, New York, N. Y., a corporation of Delaware No Drawing. Application June 7, 1946,
Serial No. 675,290

12 Claims. (Cl. 260—240)

This invention relates to 1,3-bis[3-amino-1,2,4-triazole]-oxypropenes and to a method for their preparation.

It is known in the art that light-sensitive emulsions, such as gelatin silver-halide emulsions, have a decided tendency to fog. The fog may be of two types, namely, yellow fog and chemical (gray) fog. The yellow fog, sometimes referred to as color fog or dichroic fog, is essentially a colloidal deposit of silver, the color intensity and general appearance of which are determined by the minute particle size and degree of subdivision. The fog is chiefly yellow in color and is most apparent in the lighter portions of a negative. The color may vary, however, and the colloidal silver particles may, for example, appear green by reflected light and yellow or red by transmitted light. The socalled chemical fog, or gray fog, on the other hand, is the more common and is formed in a number of ways. It may be caused by premature exposure, by excessive ripening of the emulsions, or by the storage of the film, particularly at high temperatures or for unusually long periods of time.

It is an object of the present invention to provide 1,3-bis[3-amino-1,2,4-triazole]-oxypropenes useful as stabilizers for silver-halide emulsions.

Another object of this invention is to provide a process of preparing such 1,3-bis[3-amino-1,2,4-triazole]-oxypropenes.

A further object is to provide 1,3-bis[3-amino-1,2,4-triazole]-oxypropenes as stabilizers or antifogging agents for light-sensitive silver-halide emulsions, which do not lower the sensitivity of the emulsion, and which increase its stability.

Other objects and advantages will appear from the following specification.

We have found that the above objects are accomplished by condensing a β-keto ester or anilide thereof, with a 3-amino-1,2,4-triazole. The resulting condensation product is characterized by a structure corresponding to the following general formula:

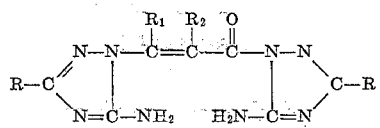

wherein R is hydrogen or an alkyl group, e. g., methyl, ethyl propyl, isopropyl, butyl, isobutyl, sec.-butyl, tert.-butyl, amyl, and the like, $R_1$ is an alkyl of the same value as R, aryl, e. g., phenyl, o-, m-, and p-tolyl, naphthyl, diphenyl, etc., aralkyl, e. g., benzyl, methylbenzyl, ethylbenzyl, and the like, $R_2$ is either hydrogen, allyl, or an alkyl of the same value as R.

The method for the preparation of 1,3-bis[3-amino-1,2,4-triazole]-oxypropenes consists of condensing 1 mol of a β-keto ester or anilide thereof, of the following general formula:

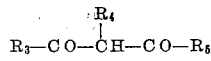

wherein $R_3$ is of the same value as $R_1$, $R_4$ is of the same value as $R_2$, and $R_5$ is an anilino or alkoxy radical, e. g., methoxy, ethoxy, propoxy, butoxy, amoxy, hexoxy, heptoxy, octoxy, and the like, with 2 mols of 3-amino-1,2,4-triazole of the following general formula:

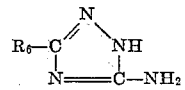

wherein $R_6$ is either hydrogen or an alkyl group, e. g., methyl, ethyl, propyl, butyl, and the like.

Suitable β-keto esters and anilides thereof are, for example, ethyl acetoacetate, ethyl benzoylacetate, ethyl α-ethyl acetoacetate, ethyl α-allyl acetoacetate, ethyl toluylacetate, ethyl propionylacetate, ethyl butyrylacetate, ethyl valerylacetate, acetoacetanilide, benzoylacetanilide, α-ethyl acetoacetanilide, α-allyl acetoacetanilide, toluylacetoacetanilide, propionylacetoacetanilide, butyrylacetoacetanilide, valerylacetoacetanilide, and the like.

As suitable 3-amino-1,2,4-triazoles may be mentioned, 3 - amino - 1,2,4-triazole, 3-amino-5-methyl-1,2,4-triazole, 3-amino-5-ethyl-1,2,4-triazole, 3 - amino - 5 - propyl - 1,2,4 - triazole, 3-amino-5-butyl-1,2,4-triazole, 3-amino-5-amyl-1,2,4-triazole, and the like.

The condensation between the β-keto ester or anilide thereof, and the 3-amino-1,2,4-triazole is carried out by heating the reaction components at a temperature ranging from 150–160° C., in the presence of an oxygenated aromatic solvent-diluent such as, for example, nitrobenzene, ethylphthalate, p - chlornitrobenzene, ethylanthranilate, acetophenone, benzyl alcohol, and the like, for a period of time ranging from 10 minutes to 2 hours. The nature of the oxygenated aromatic solvent diluent is immaterial so long as it boils at 150° C., or above, and forms a homogeneous solution of the co-reactants, at a temperature ranging from 150–160° C., and does not react with the 3-amino-1,2,4-triazole. The final product either precipitates or is removed by diluting with an aromatic hydrocarbon, such as, for example, toluene, chlorobenzene, cyclohexane, cycloheptane, cyclooctane, benzene, o-, m-, and p-xylene, ethylbenzene, 1,2,4-trimethylbenzene, propylbenzene, 1,3-ethylmethylbenzene, or an oxygenated solvent, e. g., ether, acetone, ethylmethyl ketone, diethyl ketone, dimethyl ketone, propyl ketone, allylacetone, mesityl oxide, dioxane, and the like, and recrystallized from water. Instead of heating the reaction components, the reactants may be allowed to stand in a cold, aqueous, alkaline solution such as, for example, a 5-20% aqueous solution of sodium or potassium hydroxide, for several days at room temperature. After standing for several days at room temperature, the reaction mixture is diluted with about an equal volume of water and warmed slightly to redissolve the precipitated product. To this solution a sufficient quantity of cold glacial acetic acid is added in order to neutralize the alkali, and after chilling in an ice-bath, the product is filtered off and washed several times with cold water and recrystallized from boiling water.

The 3-amino-1,2,4-triazoles and the β-keto esters and anilides thereof are well-known to the art and the methods for their preparation need not be described herein.

Specific compounds which have been prepared in accordance with the above procedures, with their formulas, are as follows:

(1)
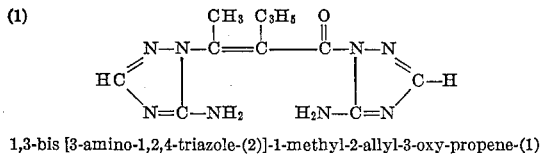

1,3-bis [3-amino-1,2,4-triazole-(2)]-1-methyl-2-allyl-3-oxy-propene-(1)

(2)
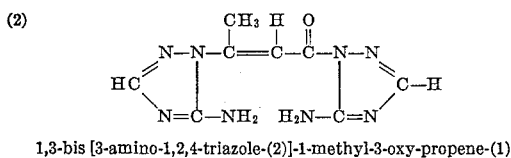

1,3-bis [3-amino-1,2,4-triazole-(2)]-1-methyl-3-oxy-propene-(1)

(3)
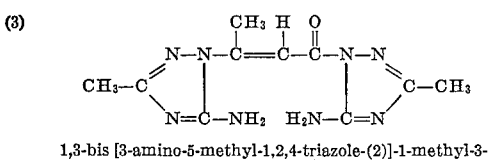

1,3-bis [3-amino-5-methyl-1,2,4-triazole-(2)]-1-methyl-3-oxy-propene-(1)

(4)
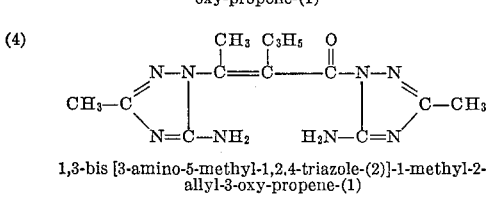

1,3-bis [3-amino-5-methyl-1,2,4-triazole-(2)]-1-methyl-2-allyl-3-oxy-propene-(1)

(5)
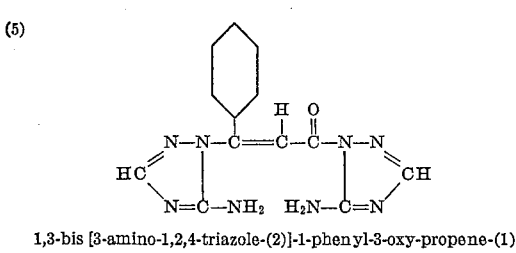

1,3-bis [3-amino-1,2,4-triazole-(2)]-1-phenyl-3-oxy-propene-(1)

(6)
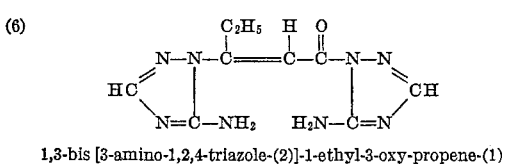

1,3-bis [3-amino-1,2,4-triazole-(2)]-1-ethyl-3-oxy-propene-(1)

(7)
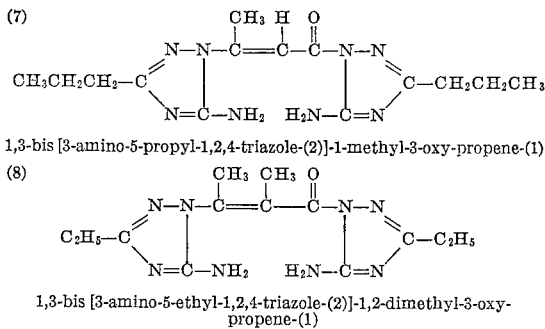

1,3-bis [3-amino-5-propyl-1,2,4-triazole-(2)]-1-methyl-3-oxy-propene-(1)

(8)

1,3-bis [3-amino-5-ethyl-1,2,4-triazole-(2)]-1,2-dimethyl-3-oxy-propene-(1)

The following examples are intended to illustrate the preparation of the compounds disclosed above. It will be appreciated that the conditions of reactions, e. g., time of reaction and temperature, may be varied and that the supplementary process of purification may be resorted to wherever found desirable. These and other variations and modifications will be evident to those skilled in the art in light of the guiding principles disclosed herein.

*Example I*

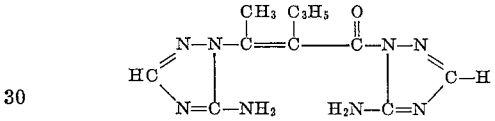

1,3-bis [3-amino-1,2,4-triazole-(2)]-1-methyl-2-allyl-3-oxy-propene-(1)

To 15 cc. of nitrobenzene, 0.1 mol (8.4 grams) of 3-amino-1,2,4-triazole and 0.05 mol (8.5 grams) of ethyl α-allyl acetoacetate were added and the mixture heated to 150–160° C., for 1 hour. The reaction mixture was cooled to room temperature and the product precipitated by the addition of ether. The precipitated product was washed several times with ether and recrystallized from water with the addition of charcoal.

*Example II*

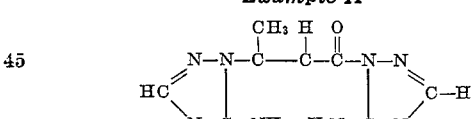

1,3-bis [3-amino-1,2,4-triazole-(2)]-1-methyl-3-oxy-propene-(1)

One-tenth mol (8.4 grams) of 3-amino-1,2,4-triazole is dissolved in 15 cc. of water and the mixture cooled to room temperature. To this solution 0.1 mol (13 grams) of ethyl acetoacetate is added. After standing for 15 minutes, a cold solution of 4 grams of NaOH in 10 cc. of water is added slowly with external cooling to keep the mixture approximately at room temperature. After standing 2 days at room temperature, the mixture is diluted to 40 cc. and warmed slightly to redissolve the precipitated product. Six grams of cold glacial acetic acid is then added, and after chilling in an ice-bath, the product is filtered off and washed with a few cc. of cold water and recrystallized from boiling water.

*Example III*

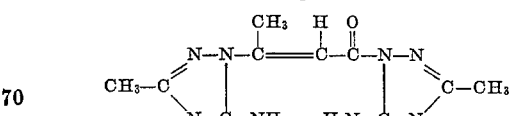

1,3-bis [3-amino-5-methyl-1,2,4-triazole-(2)]-1-methyl-3-oxy-propene-(1)

To 15 cc. of nitrobenzene, 1 mol (9.8 grams) of 3-amino-5-methyl-1,2,4-triazole and 0.05 mol (6.5 grams) of ethyl acetoacetate were added and the mixture heated to 150–160° C., for 1 hour. The reaction mixture was cooled to room temperature and the product isolated by diluting with ether and recrystallizing from water.

*Example IV*

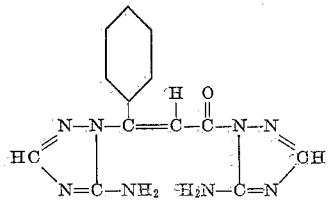

1,3-bis [3-amino-1,2,4-triazole-(2)]-1-phenyl-3-oxy-propene-(1)

Example III was repeated with the exception that 9.6 grams of ethyl benzoylacetate was substituted for 6.5 grams of ethyl acetoacetate.

In the preparation of emulsions containing the stabilizers as above prepared, a solution of the stabilizer in a suitable solvent, such as alcohol or an alcohol-water mixture, adjusted to a neutral or slightly alkaline pH, i. e., pH 7.5 to 10, is made up and the solution mixed with the emulsion at any point during its preparation, but preferably during ripening or just prior to coating in concentrations varying from 25 mg. to 500 mg. per liter of emulsion. The actual concentration employed will depend upon the type of emulsion used and may vary somewhat with the particular compound employed.

The method of testing the stabilizers employed in the following examples consists of coating two film strips, such as cellulose acetate, with the same emulsion, one with and one without any stabilizer, storing the emulsions in an incubator for six days at 50° C., then exposing, developing, fixing, and washing the same under standard conditions. The fog density or blackening produced in the unexposed areas in the two emulsions is then measured in a transmission densitometer of standard type.

The following examples will serve to illustrate certain ways in which the 1,3-bis[3-amino-1,2,4-triazole]-oxypropenes of our invention are applied as stabilizers for silver-halide emulsions, but are not to be construed as limiting the invention.

*Example V*

A photographic film coated with an ordinary gelatin-bromoiodide emulsion of normal speed and contrast on development under standard conditions, after incubation for six days at 50° C., gave a fog of 0.28 density. Another film coated with the same emulsion containing an addition of 100 mg. of the compound of Example I per 1000 cc. of emulsion, equivalent to about 50 grams of silver-halide, and developed under the same conditions, after the same incubation, gave a fog of only 0.06 density.

*Example VI*

Example V was repeated with the exception that an equivalent quantity of the compound of Example II was substituted for the compound of Example I. The results obtained were almost identical with those obtained in Example V.

*Example VII*

Example V was again repeated with the exception that 75 mg. of the compound of Example III were substituted for 100 mg. of the compound of Example I. After incubation and development, the emulsion containing the compound of Example III gave a fog of only 0.1.

Further experiments have shown that emulsions containing stabilizers in accordance with our invention have not only improved keeping qualities (i. e., a reduction in the fog produced by incubation or by long storage), but have greatly diminished and, in some cases completely eliminated changes of speed to which some emulsions are susceptible.

The stabilizers, which we have prepared and employed, may be used in various kinds of emulsions. In addition to being useful in orthochromatic and panchromatic emulsions, they may also be used in non-sensitized emulsions and X-ray emulsions. If used with sensitizing dyes they may be added to the emulsion before or after the dyes are added. The dispersing agents for the silver-halides may be gelatin or other colloid such as water-soluble cellulose derivatives, e. g., hydroxy ethyl cellulose, methyl cellulose, carboxy-oxy-cellulose, low acetyl value cellulose acetate, and the like. The stabilizers may also be employed in gelatin or other colloid, such as polyamides or a mixture of gelatin with a polyamide as described in United States Patent 2,289,775; polyvinyl alcohol and jelling compound as described in United States Patent 2,249,537; polyvinyl acetaldehyde acetal resins and partially hydrolyzed acetate resins described in United States Patents 1,939,422 and 2,036,092; cellulose derivatives, e. g., cellulose nitrate, cellulose acetate, and the lower fatty acid esters of cellulose, including simple and mixed esters and ethers of cellulose, and the like, as an under or overcoat for the emulsion, or as a backing layer for the support. Moreover, they may be incorporated in the support for the sensitive emulsion layer or in an intermediate layer between the sensitive emulsion layer and the support, such as the baryta coating commonly used in photographic papers, or they may be incorporated in a protective layer coated upon the emulsion surface, or the otherwise finished photographic material may be bathed in an alcohol or alcohol-water solution containing the stabilizer.

This application is a continuation-in-part of our copending application, Serial No. 664,254, filed on April 23, 1946, now Patent No. 2,444,608, July 6, 1948.

Since the presence of these new compounds tends to prevent chemical fog whether they are incorporated directly into the emulsion, added to a separate surface or substratum layer, it is understood that the term "photographic material" as employed herein and in the appended claims, is used in a generic sense to include each of these possible applications.

Various modifications of this invention will occur to persons skilled in the art and it is, therefore, understood that the patent granted shall only be limited by the appended claims.

We claim:

1. The chemical compounds of the general formula:

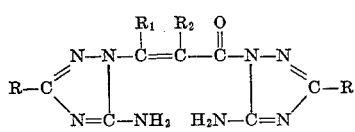

wherein R is a member selected from the class consisting of hydrogen and alkyl groups, $R_1$ is a member selected from the class consisting of alkyl, aryl and aralkyl groups, and $R_2$ is a member selected from the class consisting of hydrogen, allyl, and alkyl groups.

2. A chemical compound corresponding to the formula:

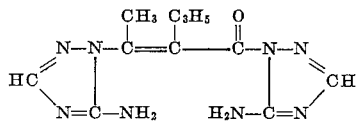

3. A chemical compound corresponding to the formula:

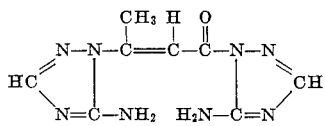

4. A chemical compound corresponding to the formula:

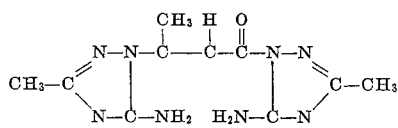

5. The process of producing 1,3-bis[3-amino-1,2,4-triazole]-oxypropenes, which comprises mixing 1 mol of a compound of the general formula:

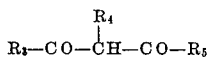

with 2 mols of a compound of the general formula:

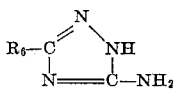

wherein $R_3$ represents a member selected from the class consisting of alkyl, aryl, and aralkyl groups, $R_4$ is a member selected from the class consisting of hydrogen, allyl, and alkyl groups, $R_5$ is a member selected from the class consisting of alkoxy and anilino groups, and $R_6$ is a member selected from the class consisting of hydrogen and alkyl groups, and recovering said oxypropenes.

6. The process of producing 1,3-bis[3-amino-1,2,4-triazole-(2)]-1-methyl-2-allyl-3-oxy-propene-(1) which comprises mixing 2 mols of 3-amino-1,2,4-triazole with 1 mol of ethyl α-allyl acetoacetate, and recovering said oxypropene-(1).

7. The process of producing 1,3-bis[3-amino-1,2,4-triazole-(2)]-1-methyl-3-oxy-propene-(1) which comprises mixing 2 mols of 3-amino-1,2,4-triazole with 1 mol of ethyl acetoacetate, and recovering said oxypropene-(1).

8. The process of producing 1,3-bis[3-amino-5-methyl-1,2,4-triazole-(2)]-1-methyl-3-oxy-propene-(1) which comprises mixing 2 mols of 3-amino-5-methyl-1,2,4-triazole with 1 mol of ethyl acetoacetate, and recovering said oxypropene-(1).

9. The process according to claim 5 wherein the mixing is conducted in the presence of an oxygenated inert solvent-diluent at a temperature ranging from room temperature to 150–160° C., for a time sufficient to complete the reaction.

10. The process according to claim 6 wherein the mixing is conducted in the presence of nitrobenzene at a temperature ranging from 150–160° C.

11. The process according to claim 7 wherein the mixing is conducted in the presence of water at room temperature.

12. The process according to claim 8 wherein the mixing is conducted in the presence of nitrobenzene at a temperature ranging from 150–160° C.

NEWTON HEIMBACH.
WALTER KELLY, Jr.

No references cited.

Certificate of Correction

Patent No. 2,475,136.　　　　　　　　　　　　　　　　　　July 5, 1949.

NEWTON HEIMBACH ET AL.

It is hereby certified that errors appear in the printed specification of the above numbered patent requiring correction as follows:

Column 1, lines 45 to 48 inclusive, right-hand nucleus of the formula, for

column 4, line 45, Example II, and column 7, line 21, claim 4, for that portion of the formula, in each instance, reading "N—N—C——C—C—N—N" read $N-N-C=C-C-N-N$;

and that the said Letters Patent should be read with these corrections therein that the same may conform to the record of the case in the Patent Office.

Signed and sealed this 6th day of December, A. D. 1949.

[SEAL]

THOMAS F. MURPHY,
　　　　　　　　　　　　　　　　　　　　　　　*Assistant Commissioner of Patents.*